United States Patent [19]

Hashimoto et al.

[11] Patent Number: 5,239,218
[45] Date of Patent: Aug. 24, 1993

[54] STEP MOTOR AND METHOD FOR RECORDING POSITION SIGNAL OF MOTOR ROTOR

[75] Inventors: Ichiro Hashimoto; Giichi Ishida, both of Hitachi, Japan

[73] Assignee: Hitachi, Ltd., Tokyo, Japan

[21] Appl. No.: 566,033

[22] Filed: Aug. 13, 1990

[30] Foreign Application Priority Data

Sep. 1, 1989 [JP] Japan ................... 1-224432

[51] Int. Cl.$^5$ .................. H02K 11/00; H02K 1/22
[52] U.S. Cl. ................. 310/68 B; 310/49 R; 310/261; 310/267
[58] Field of Search .......... 310/49 R, 268, 171, 310/68 B, 266, 267, 261; 318/138, 254, 696

[56] References Cited

U.S. PATENT DOCUMENTS

| | | | |
|---|---|---|---|
| 3,293,459 | 12/1966 | Kreuter et al. | 310/49 R |
| 3,864,588 | 2/1975 | Inaba | 310/266 |
| 4,255,696 | 3/1981 | Field, II | 318/696 |
| 4,353,016 | 10/1982 | Born | 318/254 |
| 4,509,001 | 4/1985 | Wakabayashi et al. | 318/687 |
| 4,532,447 | 7/1985 | Cibié | 310/114 |
| 4,547,714 | 10/1985 | Müller | 318/254 |
| 4,568,865 | 2/1986 | Welburn | 318/661 |
| 4,618,808 | 10/1986 | Ish-Shalom et al. | 318/696 |
| 4,638,224 | 1/1987 | Gritler | 318/254 |
| 4,687,961 | 8/1987 | Horber | 310/186 |
| 4,743,813 | 5/1988 | Tassinario | 318/138 |
| 4,763,034 | 8/1988 | Gamble | 310/181 |
| 4,772,815 | 9/1988 | Harned et al. | 310/171 |
| 4,818,908 | 4/1989 | Tamae et al. | 310/171 |
| 4,983,893 | 1/1991 | Miyashita et al. | 318/135 |

FOREIGN PATENT DOCUMENTS

61-69364 4/1986 Japan.

*Primary Examiner*—Steven L. Stephan
*Assistant Examiner*—D. R. Haszko
*Attorney, Agent, or Firm*—Antonelli, Terry, Stout & Kraus

[57] ABSTRACT

A step motor which comprises a stator having a winding wound therearound, a rotor rotatably provided with respect to the stator, a multiplicity of pole teeth formed on mutually opposing faces of the stator and rotor, a position detector for detecting a position of the rotor, and switching means for changing over a phase current flowing through the winding wound around the stator on the basis of a position signal indicative of the position of the rotor, wherein the pole teeth and a position detectable portion are integrally formed on a rotary yoke of the rotor and the position detectable portion is detected by the position detector. A method for recording a position signal of the rotor in the step motor, wherein, when the position detectable portion is made in the form of a magnetic recording medium, the pole teeth are formed on a predetermined surface of a rotary yoke of the rotor, a magnetic recording medium is provided on a surface of the rotary yoke which is not provided with the pole teeth, and a position detecting signal is magnetically recorded on the magnetic recording medium with respect to a reference position of the pole teeth.

19 Claims, 6 Drawing Sheets

STEP MOTOR AND METHOD FOR RECORDING POSITION SIGNAL OF MOTOR ROTOR

BACKGROUND OF THE INVENTION

The present invention generally relates to step motors, and, more particularly, to a step motor which has a position detector for correctly detecting a position of one of a plurality of pole teeth provided on a rotor of the motor and a method for recording a signal indicative of a position of a rotor in the motor.

A step motor is suitably used when it is desired to make a motor more compact, because the step motor exhibits high torque characteristics at low speeds and can directly drive a load without intervention of a reduction mechanism. As one example of a simple step motor there is known an open loop control type motor which is relatively easily controlled. This open loop control type motor is also referred to as a step motor, and is arranged so that a pulse current having a predetermined frequency is supplied to a stator winding to rotate a rotor in synchronism with the pulse current. In order to accurately follow the rotation of a motor in accordance with a commanded speed and to avoid any step-out, there has been proposed a step motor of a closed loop control type in which the rotational speed of a rotor or the position of one of a plurality of pole teeth provided on the rotor is detected.

In this closed loop control type motor, it is necessary to commutate a current flowing through a phase winding of the stator in association with the position of the pole tooth of the rotor and a position detector for detecting the position of the pole tooth is also required.

Figure 1:
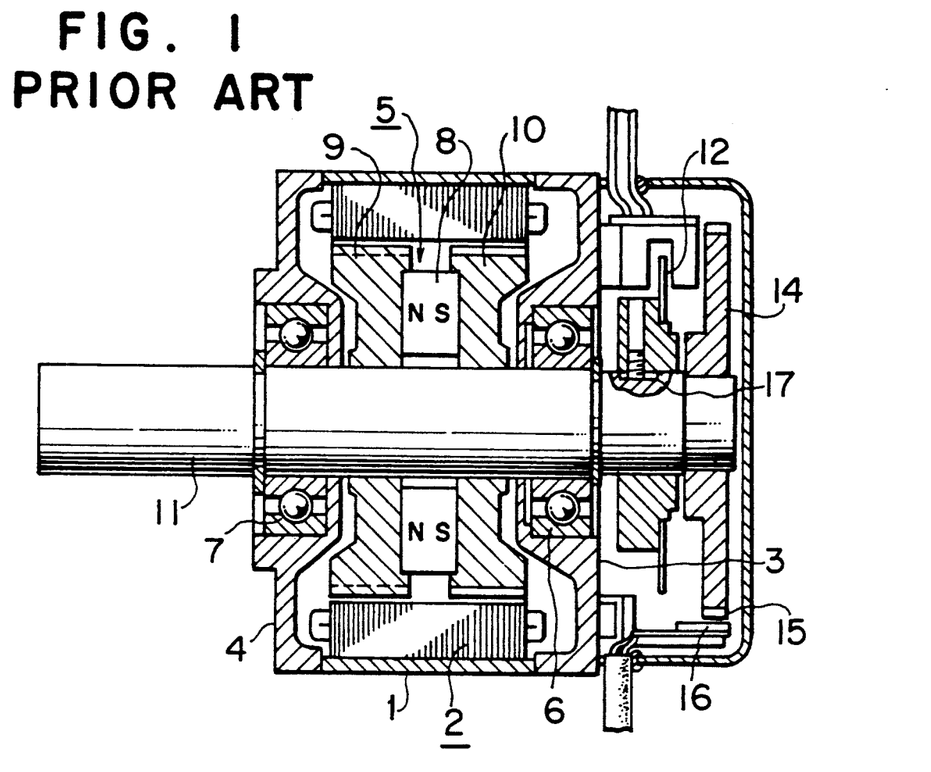
FIG. 1 is a cross-sectional view of a prior art step motor mainly showing the interior of an inner rotor.
Figure 2:
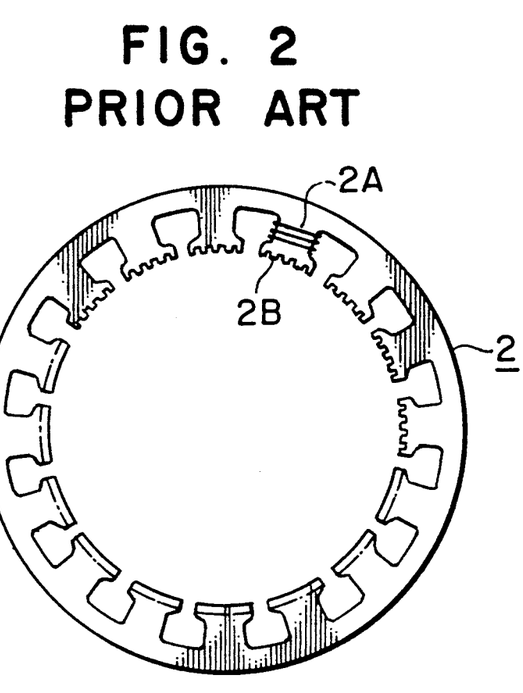
FIG. 2 is a front view of a stator in the motor.

FIG. 1 shows an ordinary step motor provided with such a position detector. In the drawing, the step motor includes a cylindrical housing 1 made of steel plate and a stator 2 of laminated silicon steel sheets disposed inside the housing 1. The stator 2, as shown in FIG. 2, is provided with 16 inwardly-projected poles 2A each having 5 pole teeth 2B at their tip ends. Provided inside the stator 2 is a rotor 5 which is rotatably journalled in end brackets 3 and 4 disposed at both ends of the housing 1. More specifically, the rotor 5 is rotatably journalled in bears 6 and 7 provided in the end brackets 3 and 4.

Figure 3:
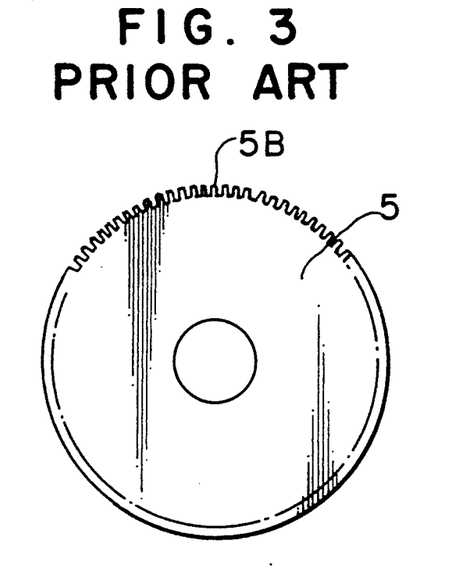
FIG. 3 is a front view of the inner rotor.

The rotor 5 comprises an exciting magnet 8 and rotor yokes 9 and 10 provided at both sides of the exciting magnet 8 so as to hold the magnet 8. The rotor yokes 9 and 10 are provided at their outer peripheries with pole teeth 5B which are opposed to the pole teeth 2B provided at the inner side of the stator 2 as shown in FIG. 3. More specifically, the rotor yokes 9 and 10 are fixedly mounted on a shaft 11 in such a relative rotational position relationship as to be mutually shifted by an amount corresponding to ½ of the pitch of the pole teeth. The pitch of the pole teeth formed in the stator is set to be equal to that formed in the rotor. The projected poles 2A are actually wound with a phase winding therearound but the phrase winding is omitted in FIG. 2. For the winding, the two-phase, three-phase or multi-phase winding can be selected to control the energization of the projected poles, depending on the specifications of the motor to be employed. The exciting magnet 8 is magnetized as shown by Ns and Ss along the axial direction in FIG. 1. The shaft 11 is outwardly extended beyond the bearings and in the illustrated example, for example, a left-side of the shaft 11 is used as an output shaft which is drivingly connected to a load while a right-side thereof is used for detection. Attached onto the right-side end of the shaft 11 is a position detecting plate 12 which detects a position of the pole teeth 5B on the outer periphery of the yoke 9 or 10 of the rotor 2 and which generates a commutation signal for a phase current flowing through the winding wound around the projected poles 2A. The position detecting late 12 has exactly the same sectional shape as the rotor yoke 9 or 10 when viewed from the axial direction. That is, the position detecting plate 12 is provided at its outer periphery with teeth which have the same number, shape and pitch as the pole teeth 5B provided at the outer peripheries of the rotor yokes 9 and 10. More specifically, since the position detecting plate 12 is set to have the same positional relationship, the position of the rotor yoke 9 or 10, i.e., the position of the stator to the projected poles, can be detected by detecting the position of the position detecting plate 12. As the method for detecting the teeth of the position detecting plate 12, there are known optical and magnetic methods for optically and magnetically detecting the teeth of the position detecting plate 12. In the event where the position detecting plate 12 is made of a non-magnetic material such as aluminum or plastic, light emitting and receiving elements are disposed at both sides of the outer peripheral teeth of the position detecting plate 12 so that the light receiving element detects the passage and interruption of light caused by the rotation of the position detecting plate 12 and converts it into an electrical signal to thereby detect the teeth of the position detecting plate 12. In the case where the position detecting plate 12 is made of a magnetic material, an element for magnetically detecting the tooth part of the position detecting plate 12, e.g., a magnetic reluctance effect element of a reactance type having a bias magnet carried on its substrate or a Hall-effect element is employed. Such an element is omitted in FIG. 1.

A speed detecting plate 14, which is made of a non-magnetic material such as aluminum, is fixedly mounted on the right end of the shaft 11. A magnetic recording medium 15 is coated on the outer periphery of the speed detecting plate 14 to record thereon many magnetic poles (magnetic signals). A speed detector 16, which is fixed to the end bracket 3, comprises a magnetic reluctance effect element for detecting the magnetic poles magnetized on the magnetic recording medium 15. As the motor rotates, the resistive value of the magnetic reluctance effect element is varied. Thus, the speed of the motor can be detected by extracting a variation in the resistive value of the magnetic reluctance effect element, for example, in the form of an electrical signal and by measuring the number of pulses in the signal within a predetermined sampling time or a time interval corresponding to two or more pulses.

A hybrid type step motor provided with such a position detector and a speed detector as mentioned above is known.

This type of step motor has the advantages of low speed and high torque but also has the technical disadvantage of not having a smooth rotation.

Figure 4:
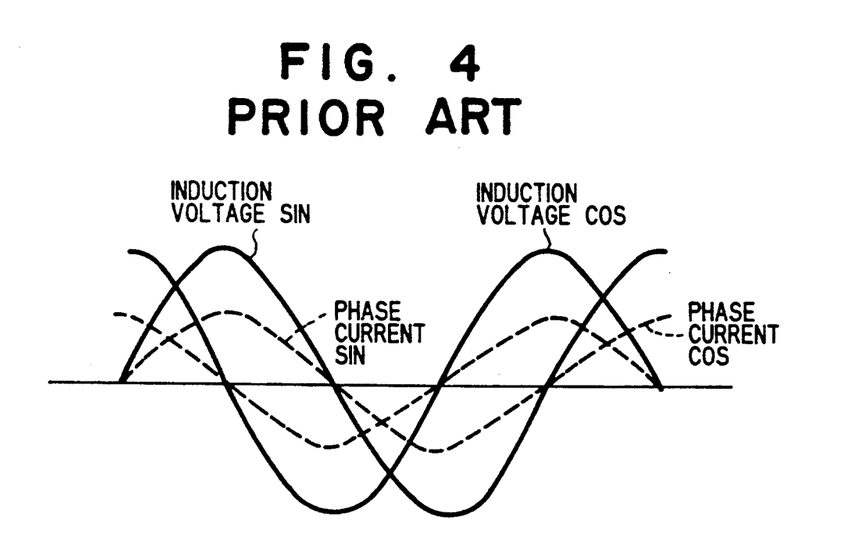
FIG. 4 shows waveforms of phase currents and induction voltages.

In order to overcome such a demerit, in the case of a two-phase step motor, it is considered to provide sinusoidal currents in phase with sinusoidal induction voltages which are generated in two phase windings and mutually phase-shifted by an electrical angle of 90 degrees as shown in FIG. 4. In this case, a torque T generated by the motor is expressed as follows;.

$$T \propto C(\sin^2\theta + \cos^2\theta) = C$$

where C denotes a constant. Hence the rotation of the motor become smooth.

Figure 5:
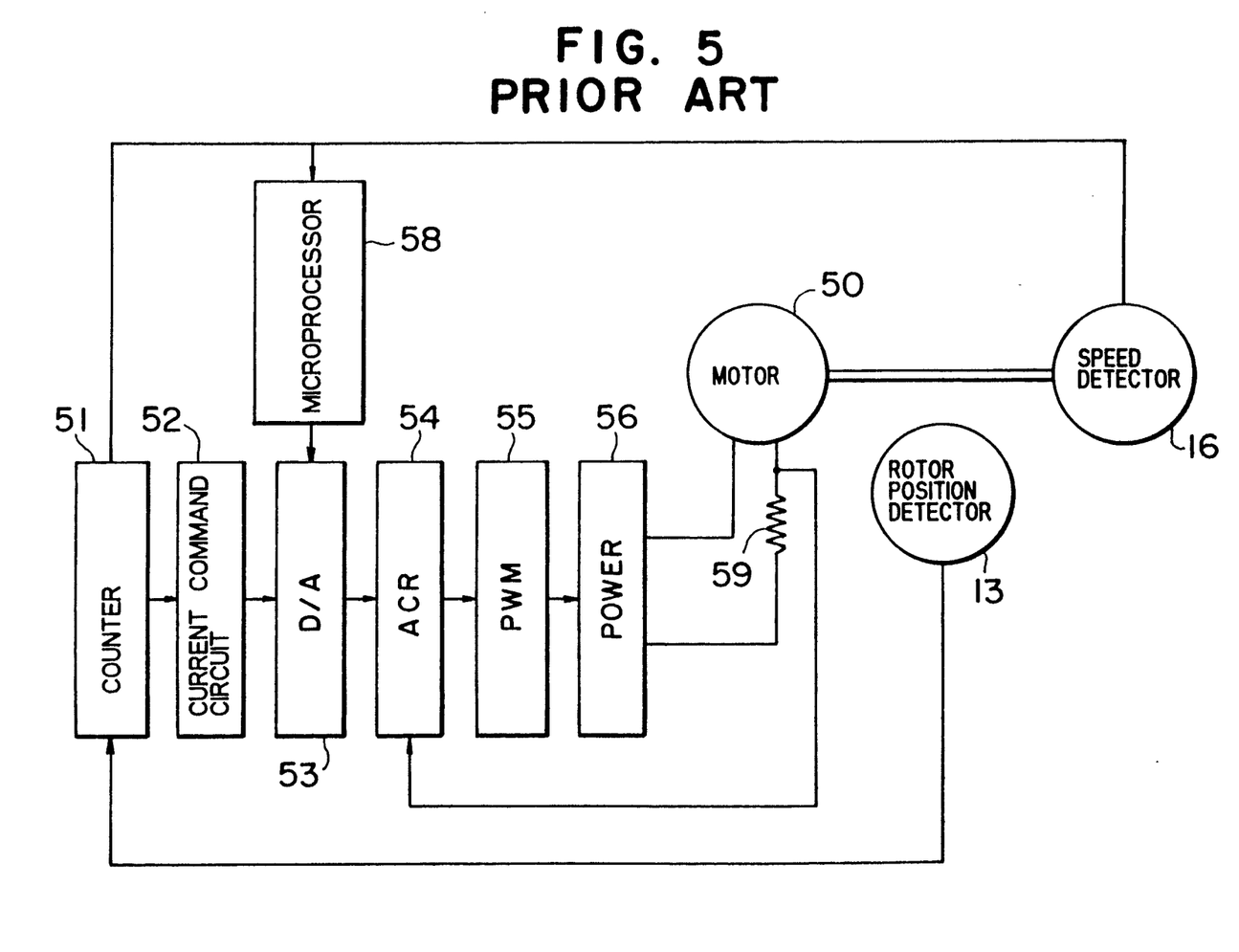
FIG. 5 is a block diagram of a control circuit used for the prior art step motor.

Explanation will next be made as to the schematic arrangement of a general control circuit for this type of step motor by referring to FIG. 5.

In the drawing, a current command circuit 52 comprises a read only memory (ROM) in which sinusoidal current commands as mentioned above are previously stored. A counter 51 counts a speed detection signal detected by the speed detector 16 coupled to a motor 50, and according to a speed determined based on the detected speed signal, a corresponding one of the sinusoidal signals previously stored in the current command circuit 52 is output to a D/A converter 53. An automatic current restricter 54 adjusts an analog output value of the D/A converter 53 and applies it to a pulse width modulation (PWM) circuit 55 of the next stage. The PWM circuit 55 applies an energization ratio (duty ratio) corresponding to the analog value commanded by the previous stage (automatic current restricter 54) to a drive circuit 56 which in turn comprises an inverter to drive motor 50 at a rotational speed commanded by the current command circuit 52.

However, driving the motor merely based on the instructed current command cannot ensure that the speed of the motor is actually maintained at the instructed speed. To this end, the aforementioned speed detector 16 is provided on the shaft 11 of the motor. That is, as the motor 50 rotates, the speed detector 16 can generate a sinusoidal signal having a frequency corresponding to the current rotational speed of the motor.

The sinusoidal signal of the speed detector 16 is converted to a pulse signal through a shaping circuit (not shown) and then sent to a microprocessor 58 where a speed corresponding to the pulse signal is calculated. The calculated speed is then sent from the microprocessor 58 to the D/A converter 53. In the D/A converter 53, the current (speed) command value received from the current command circuit 52 is compared with the calculated actual speed value received from the microprocessor 58 to generate the current command on the basis of the comparison difference. A current detecting element 59 detects a supply current to the motor and applies it to the automatic current restricter 54. The rotor position detector 13 generates an output signal corresponding to the pole tooth 5B which signal is used as a reset signal for the count value of the counter 51. That is, the respective pole teeth can cause an identical current command to be provided to the motor 50. Since the current command is digitally processed, the accuracy of generation and detection of the rotor position detection signal is only required to be within one count value of the counter 51.

In order to smoothly rotate the motor at very low speeds without any irregular rotation, however, the resolution of the speed detector 16 must be set to be high, and thus it is necessary to set the resolution (the number of pulses generated per one turn) of the speed detector 16 at at least 3600FC (fine count).

In this way, when the speed detector 16 having a high resolution is employed, this also requires the position of the pole tooth 5B of the rotor to be detected at a high accuracy without any error.

In the case of such a position detector as shown in FIG. 1, the position detecting plate 12 having the same shape as the rotor yoke 9 or 10 is used to detect the outer peripheral pole tooth 5B of the rotor 5, thus involving an accuracy problem on the rotational position alignment between the rotor 5 and position detecting plate 12. Further, it is impossible to make the position detecting plate 12 in exactly the same shape as the rotor yoke 9 or 10, which results in that the pole tooth 5B of the rotor cannot be correctly detected without any error.

For the purpose of solving such problems, there has been proposed a step motor as disclosed in JP-A-61-69364, in which a rotor position detecting projection pole is provided for directly detecting projection poles provided at the outer periphery of the rotor and a winding is wound around the rotor position detecting projection pole. In this case, the position detecting projection pole detects the projection poles formed at the outer periphery of the rotor directly through the position detecting winding and uses the detected signal for the phase switching of the winding.

Such an arrangement is considered to be effective, since the position of the rotor projection poles can be directly detected by means of the winding, and thus the correct position of the projection poles can be detected.

SUMMARY OF THE INVENTION

In the case of such a general step motor as shown in FIG. 1, the position detecting plate 12 for detecting the position of the rotor is provided as a part separated from the rotor and has a physical structure which impedes the direct detection of the position of the rotor. Therefore, it is impossible to detect the accurate relative position of the pole tooth provided at the stator projection pole with respect to the pole tooth of the rotor and thus accurate commutation of a current flowing through the phase winding cannot be realized. When the commutation is not exactly synchronized with the pole tooth of the stator, this tendency becomes remarkable, particularly, at very low speeds of the motor.

The positional alignment of the position detecting plate 12 to the rotor is carried out by forming a flat part 17 on the shaft 11 as a reference and by mounting the rotor 5 and position detecting plate 12 with respect to the reference flat part 17. In actual circumstances, however, this is not sufficient and the phase and commutation timing are actually adjusted for individual motors by changing the present value of the counter 51 of the control circuit in the motor operation.

The step motor of JP-A-61-69364 is advantageous in that the position of the magnetic pole tooth of the rotor can be accurately detected because the rotor magnetic pole tooth is directly detected by means of the position detecting winding wound around the pole, but is disadvantageous in that all the magnetic pole teeth of the rotor and projection poles cannot be used to drive the motor because the detection winding and the projection pole wound by the detecting winding are arranged to be alternately provided between the projection poles having a driving function. Thus, in this prior art step motor, the high torque performance which is one of the desirable features of this type of motor is undesirably deteriorated.

In view of such circumstances, it is an object of the present invention to provide a high-torque step motor operable at a constant low speed which can detect accurately pole teeth of a rotor while preventing deterioration of a high torque performance inherent to the step motor, and can generate a commutation signal optimum for a phase winding on the basis of the accurate pole tooth detection, and also to provide a method for recording a positional signal of a rotor in the step motor.

In accordance with an aspect of the present invention, the above object is attained by providing a step motor which comprises a stator having a winding wound therearound, a rotor rotatably provided with respect to the stator, a multiplicity of pole teeth formed on mutually opposing faces of the stator and rotor, a position detector for detecting a position of the rotor, and switching means for changing over a phase current flowing through the winding wound around the stator on the basis of a position signal obtained from the position detector, wherein the pole teeth and a position detecting means are integrally formed by plastic working or the like on a rotary yoke of the rotor and the position detecting means is detected by the position detector.

In this way, since the pole teeth and position detecting means can be integrally formed by forging with use of the same metallic die, any error in the position and dimensions can be completely eliminated, and thus the accurate detection of the position of the rotor can be realized.

DESCRIPTION OF THE PREFERRED EMBODIMENTS

Figure 6:
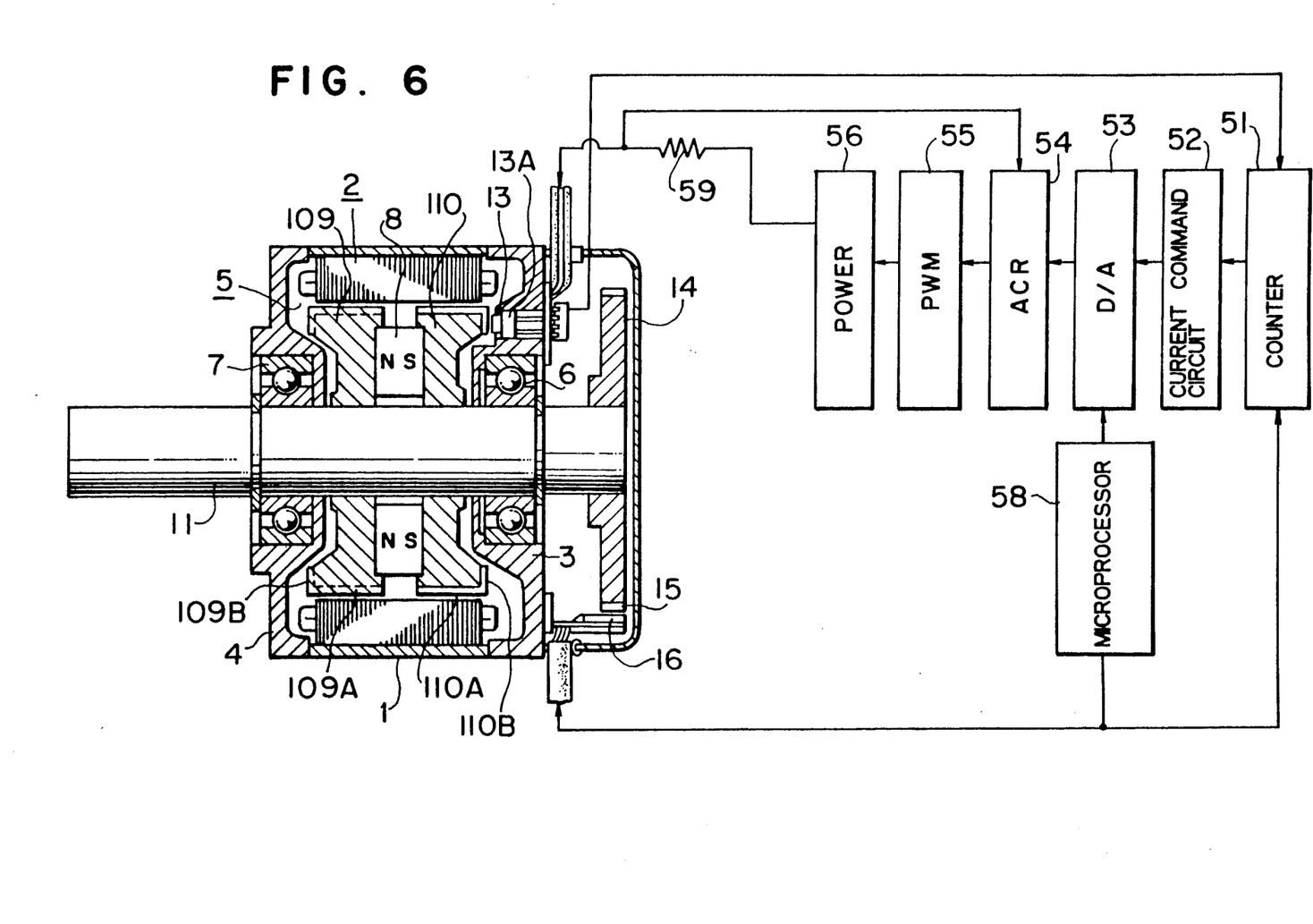
FIG. 6 shows and inner rotor type step motor in cross-section and a control circuit therefor in block diagram in accordance with an embodiment of the present invention.
Figure 7:
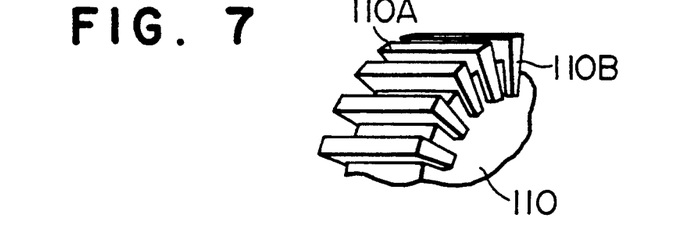
FIG. 7 is a partial perspective view for explaining position detecting teeth used in the embodiment.

Referring to FIGS. 6 and 7, there is shown an arrangement of a first embodiment of the present invention, in which the same parts and constituent elements as those already explained in connection with FIG. 1 are denoted by the same reference numerals and symbols and explanation thereof is omitted.

In the first embodiment, rotor yokes 109 and 110 are manufactured, for example, by forging or a like process. The rotor yokes 109 and 110 are integrally provided at their outer peripheries and end faces with pole teeth 109A and 110A and position detecting teeth 109B and 110B as a position detectable portion continuously connected thereto, respectively. Referring to FIG. 7, as will be apparent to one of ordinary skill in the art, pole teeth 109A and 110A provide concavities 111 and convexities 112 on the rotor yokes 109 and 110, and the position detecting teeth 109B and 110B are separate from the concavities 111 and the convexities 112 provided by the pole teeth 109A and 110A. More specifically, the tooth number, shape and rotational position are exactly the same between the pole teeth 109A and 110A and between the position detecting teeth 109B and 110B. In addition, the pole teeth 109A and 110A and the position detecting teeth 109B and 110B are formed by plastic working or forging to become continuous to each other. Thus, the pole teeth 109A and 110A can be accurately detected by detecting the position detecting teeth 109B and 110B continuous to the pole teeth 109A and 110A. It will be appreciated that the position detecting teeth 109B and 110B and the pole teeth 109A and 110A can be integrally forged with use of the same metallic die and therefore any error will not take place between the both. It is well known to those skilled in the art that the dimensional accuracy of a metallic die is very high.

The position detector 13 provided in the end bracket 3 comprises a Hall-effect element. Mounted on the rear side of the position detector 13 is a bias magnet 13A. The position detector 13 generates a position detection signal on the basis of the presence or absence of the position detecting teeth 110B. This position detection signal is used to detect the position of the rotor and switch the phase current. The position detecting teeth 109B and 110B both may be used for position detection, but in the illustrated embodiment, the position detecting teeth 110B are employed for that purpose. Both the position detecting teeth 109B and 110B can be actually employed. In this case, the position detecting teeth 109B may be considered useless at first glance from the viewpoint of position detection. However, since the rotor yokes 109 and 110 are formed to be identical from the viewpoint of economy and are axially symmetrically mounted on the shaft 11, this produces a favorable effect that the entire rotor is balanced. In the present embodiment, when the position of the Hall-effect element is adjusted relative to the position detecting teeth 110B for switching of the phase current, the position of the rotor pole teeth relative to the projected teeth 2A (FIG. 2) can be determined, and adjustment of the phase and commutation timing can be easily realized. Like the prior art of FIG. 1, in the embodiment of FIG. 6, the speed detecting plate 14 coated on its outer periphery edge with the magnetic recording medium 15 is mounted on one end of the shaft 11 opposed to the output shaft part, and the rotation of the speed detecting plate 14 is detected by the speed detector 16. As illustrated, the step motor of the present embodiment is connected to a prior art control circuit as shown in FIG. 5 to be driven under control of the control circuit.

The step motor of the foregoing embodiment is a usual inner rotor type motor. Next, explanation will be made of a second embodiment using an outer rotor type step motor by referring to FIGS. 8 and 9.

Figure 8:
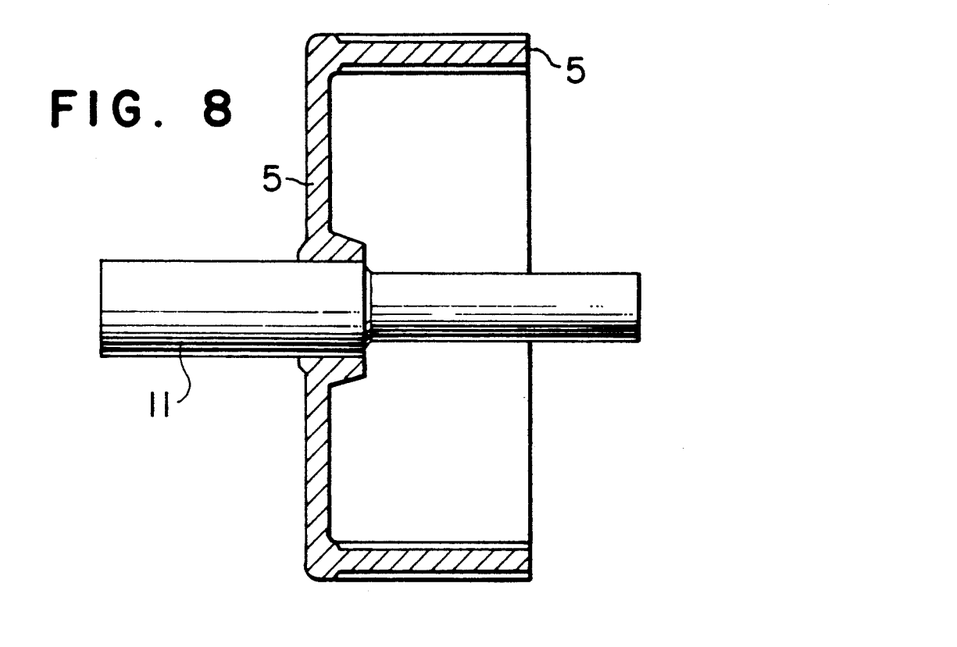
FIG. 8 schematically shows a major part of and outer rotor type step motor in accordance with another embodiment of the present invention.
Figure 9:
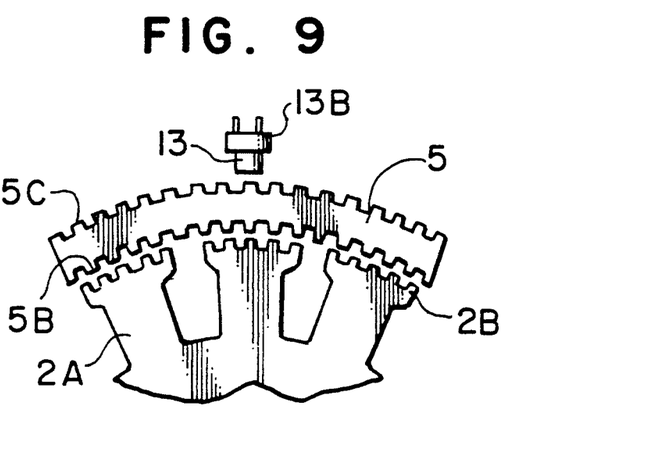
FIG. 9 is a view for explaining position detecting teeth used in the second embodiment.

Shown in FIG. 8 is a cup-shaped rotor 5 as an outer rotor which is mounted to a stator 2 in such a positional relation as shown in FIG. 9. As will be clear from the drawing, the rotor 5 is provided at its inner periphery with pole teeth 5B which are opposed to the teeth 2B of the stator 2 and also is formed at its outer periphery with position detecting teeth 5C. Since the pole teeth 5B and the position detecting teeth 5C are both forged by the same die as in the first embodiment, no positional shift will take place between the pole teeth 5B and the position detecting teeth 5C.

As a result, a detection signal from the position detector 13 can be made very accurate as mentioned above.

Figure 10:
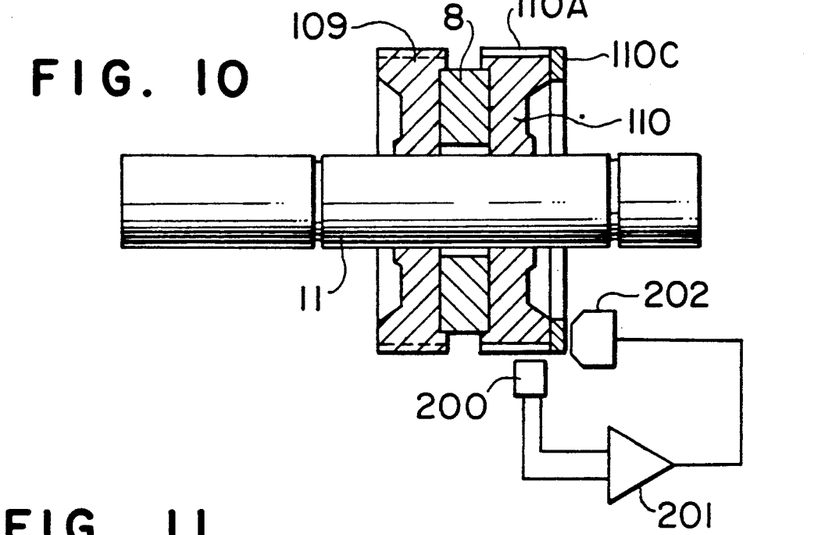
FIG. 10 is a schematic cross-sectional view of an inner rotor type step motor with its control circuit in accordance with a further embodiment of the present invention.

Both the position detecting teeth and the pole teeth have been forged in the foregoing two embodiments, but the present invention can also be modified as a third embodiment as shown in FIG. 10 wherein a rotor yoke 110 is coated on its outer peripheral side with a magnetic recording medium 110C. In the present embodiment, more specifically, the rotor yoke 110 is coated on its outer peripheral side with the magnetic recording medium 110C which contains a lot of magnetic particles, and the magnetic recording medium 110C is magnetized in the form of magnetic poles N and S with respect to the reference pole teeth 110A. As illustrated, the magnetization is carried out by a magnetizing head 202 disposed opposing medium 110C, a magnetic head 200 is disposed as opposed to pole teeth 110A so that a pole tooth signal detected by the magnetic head 200 is amplified at an amplifier 201 and then sent to the magnetizing head 202 as a magnetizing signal.

In the third embodiment, the shape of the rotor yoke 110 can be made simple and thus forming thereof can be facilitated. In addition, since the signal to be used to magnetically record on medium 110C is obtained from the pole teeth 110A, any positional shift between the magnetizing signal of medium 110C and the pole teeth 110A can be completely eliminated.

Although medium 110C has been provided on the side of the rotor yoke 110 in the present embodiment, the medium may be provided on the outer periphery thereof. Further, the type of the step motor to be applied is not limited to the inner or outer rotor type. That is, even in the third embodiment, the outer rotor type may be employed if necessary. The latter case is shown in FIG. 11 as a fourth embodiment using an outer rotor type step motor.

Figures 11, 12:
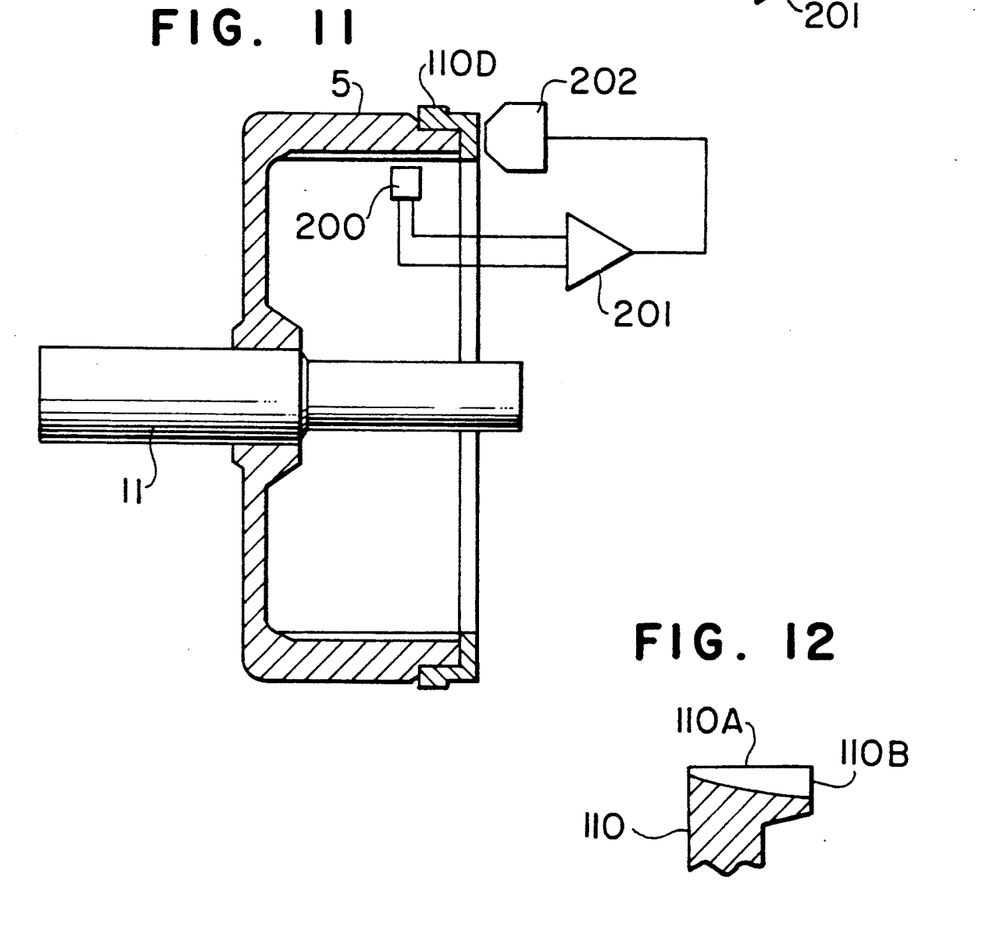
FIG. 11 is a schematic cross-sectional view of an outer rotor type step motor with its control circuit in accordance with yet another embodiment of the present invention.
FIG. 12 schematically shows an exemplary cutting example of a rotor yoke.

In FIG. 11, a plastic magnet 110D is employed as the magnetic recording medium mentioned above and the rest of the arrangement is substantially the same as that in FIG. 10.

Generally speaking, an outer rotor type step motor has the advantage that the diameter of the rotor can be made large, the inertial moment of the rotor during its operation can be made large, and thus the torque can be made large.

When the magnetic recording medium is provided on the outer periphery of the rotor, the axial dimension of the entire motor can be made short.

Though the pole teeth 110A have been formed by cutting, plastic working or forging with use of the same metallic die, the pole teeth 110A can be formed, for example, as shown in FIG. 12 to have a groove as shown by a solid line by positioning a circular cutting tool in contact with the outer periphery of the rotor yoke 110 as shown by a dotted line and by rotating the cutting tool. In the latter case, the cut groove has an arc segment because of the use of the circular cutting tool. When a linearly reciprocating cutting tool is employed, the obtained groove can be made linear. The end of the pole teeth 110A is used as the position detecting teeth 110B as a matter of course.

In any case, since the pole teeth and the position detecting teeth are cut with the same cutting tool, the pole teeth 110A and the position detecting teeth 110B can have the same position and thus can be machined without any error.

As has been disclosed in the foregoing, in accordance with the present invention, there is provided a step motor which comprises a stator having a winding wound therearound, a rotor rotatably provided with respect to the stator, a multiplicity of pole teeth formed on mutually opposing faces of the stator and rotor, a position detector for detecting a position of the rotor, and switching means for changing over a phase current flowing through the winding wound around the stator on the basis of a position signal indicative of the position of the rotor, wherein the pole teeth and a position detecting means are integrally formed on a rotary yoke of the rotor and the position detecting means is detected by the position detector. As a result, the position of the pole teeth of the rotor can be accurately detected and an optimum commutation signal can be obtained on the basis of the detected position, so that a high-torque step motor operable at a constant low speed can be realized.

In addition, when the position detecting means is made in the form of a magnetic recording medium, since the magnetic recording medium performs its magnetic recording operation with respect to the reference pole teeth, positional shift can be eliminated between the magnetizing signal indicative of the rotor position and the pole teeth and the position of the pole teeth can be accurately detected.

What is claimed is:

1. A step motor comprising:
   a stator around which a winding is wound;
   a rotor rotatably provided with respect to said stator;
   a multiplicity of stator and rotor pole teeth formed on mutually opposing faces of said stator and rotor;
   a position detector for detecting a position of the rotor; and
   switching means for changing over a phase current flowing through said winding wound around the stator on the basis of a position signal indicative of the position of the rotor,
   wherein said rotor pole teeth and a position detectable portion are integrally formed on a yoke of said rotor, said position detectable portion being formed on the rotor yoke such that said position detectable portion does not oppose said stator pole teeth, and wherein said position detectable portion is detected by said position detector.

2. A step motor as set forth in claim 1, wherein said rotor pole teeth are formed on an outer periphery of the yoke of said rotor and said position detectable portion is made in the form of position detecting teeth provided on a side of the rotor yoke.

3. A step motor as set forth in claim 1, wherein said rotor pole teeth are formed on an inner periphery of the yoke of said rotor and said position detectable portion is made in the form of position detecting teeth provided on an outer periphery of the rotor yoke.

4. A step motor as set forth in claim 1, wherein said position detectable portion is made in the form of a magnetic recording medium provided on a face of the yoke of said rotor which is not provided with said rotor pole teeth for recording a magnetizing signal for position detection on said magnetic recording medium.

5. A step motor as set forth in claim 4, wherein said rotor pole teeth are formed on an outer periphery of the yoke of said rotor and said magnetic recording medium is provided on a side of the rotor yoke.

6. A step motor as set forth in claim 4, wherein said rotor pole teeth are formed on an inner periphery of the yoke of said rotor and said magnetic recording medium is provided on a side of the rotor yoke.

7. A step motor as set forth in claim 4, wherein said magnetic recording medium is a plastic magnet.

8. A step motor as set forth in claim 1, wherein said position detectable portion is made in the form of position detecting teeth integrally provided with said rotor pole teeth, and the yoke of said rotor is a forged yoke.

9. A step motor as set forth in claim 1, wherein said position detectable portion is made in the form of position detecting teeth integrally provided with said rotor pole teeth, and the rotor pole teeth and the position detecting teeth on the yoke of said rotor are integrally cut.

10. A method for recording a position signal of a rotor in a step motor comprising:
   a stator around which a winding is wound;
   a rotor rotatably provided with respect to said stator;
   a multiplicity of stator and rotor pole teeth formed on mutually opposing faces of said stator and rotor;
   a position detector for detecting a position of the rotor; and
   switching means for changing over a phase current flowing through said winding wound around the stator on the basis of a position signal indicative of the position of the rotor,
   said method comprising the steps of:
   forming said rotor pole teeth on a predetermined surface of a yoke of said rotor;
   providing a magnetic recording medium on a surface of said rotor yoke other than the predetermined surface such that said magnetic recording medium does not oppose said stator pole teeth; and
   magnetically recording a position detecting signal on said magnetic recording medium with respect to a reference position of the rotor pole teeth.

11. A step motor according to claim 1, wherein the pole teeth of the rotor provide concavities and convexities on the yoke of the rotor, and wherein the position detectable portion is separate from the concavities and convexities provided by the pole teeth of the rotor.

12. A step motor according the claim 4, wherein the pole teeth of the rotor are formed on one of an outer periphery of the yoke of the rotor and an inner periphery of the yoke, and wherein the magnetic recording medium is provided at least on a side of the rotor yoke.

13. A step motor according to claim 4, wherein the magnetizing signal for position detection is recorded on the magnetic recording medium, and wherein the position detector detects the magnetizing signal recorded on the magnetic recording medium.

14. A step motor comprising:
   a stator including a plurality of stator pole teeth;
   a stator winding wound on the stator;
   a rotor including a plurality of rotor pole teeth provided on a first surface of the rotor, and a position detectable portion provided on a second surface of the rotor different from the first surface of the rotor, wherein the rotor is rotatably disposed with respect to the stator such that the rotor pole teeth oppose the stator pole teeth and such that the position detectable portion does not oppose the stator pole teeth, and wherein a current is caused to flow in the stator winding to enable rotation of the rotor;
   a position detector for detecting a position of the rotor and producing a position signal indicative of the detected position of the rotor; and
   switching means for switching the current flowing in the stator winding on the basis of the position signal produced by the position detector during the rotation of the rotor.

15. A step motor according to claim 14, wherein the rotor pole teeth are provided on an outer peripheral surface of the rotor, and the position detectable portion includes position detecting teeth provided on a side surface of the rotor.

16. A step motor according to claim 14, wherein the rotor pole teeth are provided on an inner peripheral surface of the rotor, and the position detectable portion includes a plurality of position detecting teeth provided on an outer peripheral surface of the rotor.

17. A step motor according to claim 14, wherein the rotor pole teeth are provided on an outer peripheral surface of the rotor, and the position detectable portion includes a magnetic recording medium provided on a side surface of the rotor, and wherein a magnetizing signal for position detecting is recorded on the magnetic recording medium and the position detector detects the magnetizing signal recorded on the magnetic recording medium.

18. A step motor according to claim 14, wherein the rotor pole teeth are provided on an inner peripheral surface of the rotor, and the position detectable portion includes a magnetic recording medium provided on a side surface of the rotor, and wherein a magnetizing signal for position detection is recorded on the magnetic recording medium, and the position detector detects the magnetizing signal recorded on the magnetic recording medium.

19. A step motor according to claim 14, wherein the rotor pole teeth are provided on an inner peripheral surface of the rotor, and the position detectable portion includes a plastic magnet provided at least on a side surface of the rotor.

* * * * *